June 18, 1935.  A. ABRAHAMSEN ET AL  2,005,407
METHOD OF MANUFACTURING IMPREGNATED TEXTILE BELTING
Filed June 8, 1933
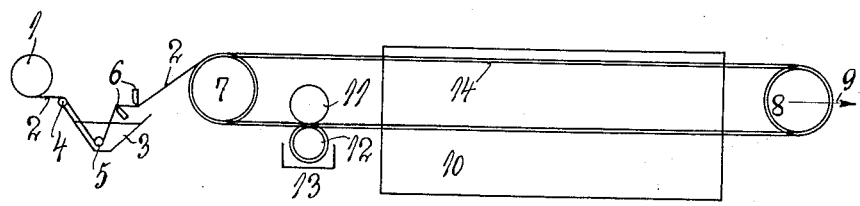
Inventors:
Alfred Abrahamsen
and Johannes Eugen Hansen
By
Attorney Patented June 18, 1935

2,005,407

UNITED STATES PATENT OFFICE 2,005,407

METHOD OF MANUFACTURING IMPREGNATED TEXTILE BELTING

Alfred Abrahamsen and Johannes Eugen Hansen, Lillesand, Norway

Application June 8, 1933, Serial No. 674,949
In Norway May 21, 1932

11 Claims. (Cl. 154—4)

This invention relates to the manufacture of textile belting and has for its object a method of manufacturing driving and conveying belts by cementing together several layers of textile fabric with the use of aqueous dispersions of rubber, balata, gutta percha and kindred substances as cementing and impregnating means.

An important feature of this method of manufacture consists therein that the belt plate obtained by cementing together a plurality of fabric layers is stretched and calendered while still in a moist condition.

By this method the operation of stretching is thus carried into effect before the cementing material has caused the threads in the individual layers of fabric to become united. In this feature the method differs from the usual method of operation in connection with the manufacture of textile belting impregnated with rubber, in which the vulcanization takes place while the belting is under stretch in presses. In this known method of operation the layers of fabric are dry during the stretching operation and the consequence of this is that belts manufactured in this way will increase considerably in length during use.

As a consequence of the method employed in the manufacture of the belting plates according to the present invention, the layers of fabric do not become finally united before the belt has obtained full stretch, and the cement will therefore not cause a subsequent shrinkage or shortening of the belt.

The method also makes it unnecessary to employ the usual expensive machinery for the manufacture of rubber belting, and the manufacturing costs will therefore be less than usual. In the manufacture of belting in accordance with the present invention the cementing together of the individual layers of fabric may take place in any suitable way, for example by placing layers of fabric after their having been coated with latex as an endless web over rotary drums, or by placing the layers of fabric in adjusted lengths on one another upon a table.

In case of the layers of fabric being laid together over revolving drums, the plate of belting hereby formed may be stretched, dried and pressed together while continuously travelling over and around the same drum on which they are united.

The dispersion or emulsion employed as a cement may be used in the concentration in which rubber emulsions occur in nature or after concentration or dilution and is suitably prepared before use in the usual manner by the addition of preservative agents, vulcanizing means (sulphur or sulphur compounds), and it may be also other additions, such as casein. The vulcanizing of the employed latex may be effected before its being applied to the web of fabric, but it is preferred to carry the vulcanization into effect after the belting has been dried and stretched.

In the following an embodiment of the invention is described with reference to the accompanying drawing which represents a diagrammatic view of the apparatus employed.

In the illustrated example 1 is a roll of fabric, and 2 the web of fabric drawn from this roll. 3 is an impregnation vessel containing latex, 4 and 5 pipes over which the web is led through the impregnation bath in vessel 3. The pipe 5 at the bottom of the vessel is fastened to a guide so that it can be lifted entirely out of the bath. 6 are knives for scraping off superfluous latex. 7 and 8 are drums over which the layers of fabric run during the cementing and stretching operations. The drum 7 runs in stationary bearings and serves as driving drum. The second drum 8 is mounted on a car which by means of steel ropes 9 from a winch can be pulled sideways for continuously stretching the layers of fabric over the drums. 10 is a drying chamber provided with ribbed tubes. 11, 12 are calender rollers, the lowermost (12) of which runs in a vessel 13 which may contain latex.

In recesses in the surface of the drums 7 and 8 run endless guide wires 14 spaced from one another a distance corresponding to the breadth of the fabric. To these wires are fastened the sides of the end part of the fabric for facilitating the insertion of same over the rollers.

When the illustrated apparatus is in use, the operation may be as follows:

The outer end of the web is fastened to the guide wires 14, which then run in recesses in the drum. The drums are then kept running until the desired number of layers has been drawn around the drums. When all layers are laid on, the end of the web is fastened and the wires are unfastened. The drying chamber is slightly heated some time after the stretching has been started. The plate of fabric layers is stretched completely before the cement becomes solid. The temperature in the drying chamber 10 is raised to about 80° and the plate is finally subjected to forceful rolling by means of the calenders 11, 12. The plate is now kept in a stretched condition until it is entirely cooled. It is then ready to be cut into the desired widths.

In the described example the employed latex is presumed to have a concentration of 60 g./100 g. of rubber with an addition of about 5% of NH₃. The latex is presumed to be applied at ordinary temperature. The layer of latex may be controlled to some extent by means of the knives 6 over the impregnation vessel 3 and also by stretching the web before it enters the vessel.

If it is desired to obtain a belt with one clean side, latex is applied to the first round of the web by means of the calender 12 dipping into latex in vessel 13. Otherwise the latex is applied in its entirety in the vessel 3.

Instead of preparing the belt plate or sheet as an endless ribbon by continuous assemblage during rotation, one may proceed according to the method in which layers of fabric in adjusted lengths are coated with latex and placed on top of one another layer by layer on a table.

When the belting is produced in this way, one may for example proceed as follows:

Liquid rubber composition is applied to one side of the first layer of fabric. The fabric is placed on a flat slightly heated support with the uncoated side downwards.

The second layer and the following ones are coated on both sides. The so obtained sheet which is quite moist is now partially dried, and in the course of this partial drying the sheet may be subjected to slight stretching. When the cement composition between the individual layers has solidified to such an extent that the sheet is capable of being manipulated with cautiousness, the sheet is placed in the stretching apparatus shown in the drawing. The stretching, drying and vulcanizing are thereupon carried out in the manner described in connection with the first example.

In order to permit of handling the belt sheet in the illustrated stretching apparatus, the ends of the belt sheet are connected to one another by means of clipper locks.

We claim as our invention:

1. Method of manufacturing laminated driving and conveyor belting, comprising the steps of moistening fabric with an aqueous dispersion of rubber and the like, superposing a plurality of layers of the moistened fabric, subjecting the resulting laminated product to continued tensioning, causing water to be evaporated from the moist laminated product under tension, and continuing the tensioning treatment until substantially complete evaporation of the water has been effected.

2. Process according to claim 1, in which a continuous band of fabric is passed continuously through a moistening zone and on to and over a continuously running couple of tensioning rollers until a sufficient number of layers of moistened bands of fabric has been wound up on the rollers in contact with one another, causing water to be evaporated from the said composite product under tension between the rollers, maintaining the tensioning rollers running until substantially complete removal of the water in the composite product and thereupon removing the composite product from the tensioning rollers.

3. Method of manufacturing laminated driving and conveyor belting, comprising the steps of moistening fabric with an aqueous dispersion of rubber and the like, superposing a plurality of layers of the moistened fabric, subjecting the resulting laminated product to continued tensioning, causing water to be evaporated from the moist laminated product under tension, and continuing the tensioning treatment until substantially complete evaporation of the water has been effected, the said composite fabric being subjected to calendering treatment during the evaporation and tensioning treatment.

4. Method of manufacturing laminated driving and conveyor belting, comprising the steps of moistening fabric with an aqueous dispersion of rubber and the like, superposing a plurality of layers of the moistened fabric, subjecting the resulting laminated product to continued tensioning, causing water to be evaporated from the moist laminated product under tension, and continuing the tensioning treatment until substantially complete evaporation of the water has been effected, the said evaporation of water being promoted by heating the composite belt under tension.

5. Method according to claim 1, in which a moistened laminated belt is caused to pass through a heating drying chamber while maintained under tension.

6. A method of manufacturing laminated driving and conveyor belting comprising impregnating a fabric strip with an aqueous dispersion of rubber superposing a plurality of layers of the impregnated fabric while moist, stretching the laminated product while still moist, evaporating the moisture from the laminated product while still subjecting to stretching, continuing to stretch the product until substantially completely dry and subjecting the laminated product to calendering during the stretching and drying treatment.

7. A method of manufacturing laminated driving and conveyor belting comprising impregnating a fabric strip with an aqueous dispersion of rubber superposing a plurality of layers of the impregnated fabric while moist, stretching the laminated product while still moist, evaporating the moisture from the laminated product while still subjecting to stretching, continuing to stretch the product until substantially completely dry, subjecting the laminated product to calendering during the stretching and drying treatment, and subsequently vulcanizing the so treated product.

8. A method of manufacturing laminated driving and conveyor belting comprising impregnating a fabric strip with an aqueous dispersion of rubber, passing the impregnated fabric strip while wet in belt fashion about two spaced rolls, winding the strip about said rolls to form a laminated endless belt, increasing the space between the rolls while the laminated endless belt is still moist to stretch the same, and drying the belt while in a stretched condition.

9. A method of manufacturing laminated driving and conveyor belting comprising impregnating a fabric strip with an aqueous dispersion of rubber, passing the impregnated fabric strip while wet in belt fashion about two spaced rolls, winding the strip about said rolls to form a laminated endless belt, increasing the space between the rolls while the laminated endless belt is still moist to stretch the same, drying the belt while in a stretched condition, and subsequently drying the so-formed belt.

10. A method of manufacturing laminated driving and conveyor belting comprising impregnating a fabric strip with an aqueous dispersion of rubber, passing the impregnated fabric strip while wet in belt fashion about two spaced rolls, winding the strip about said rolls to form a laminated endless belt, increasing the space between the rolls while the laminated endless belt is still moist to stretch the same, rotating the rolls to cause the belt to travel, passing the stretches of said belt between the rolls through a drying zone, applying heat to the portions of said belt passing through the drying zone, and continuing to stretch the belt until substantially completely dry.

11. A method of manufacturing laminated driving and conveyor belting comprising impregnating a fabric strip with an aqueous dispersion of rubber, passing the impregnated fabric strip while wet in belt fashion about two spaced rolls, winding the strip about said rolls to form a laminated endless belt, increasing the space between the rolls while the laminated endless belt is still moist to stretch the same, rotating the rolls to cause the belt to travel, passing the stretches of said belt between the rolls through a drying zone, applying heat to the portions of said belt passing through the drying zone, continuing to stretch the belt until substantially completely dry, and subsequently vulcanizing the so-formed belt.

ALFRED ABRAHAMSEN.
JOHANNES EUGEN HANSEN.